UNITED STATES PATENT OFFICE.

CHARLES FONTAYNE, OF NEW YORK, N. Y.

IMPROVEMENT IN PROCESS OF ORNAMENTING GLASS, &c.

Specification forming part of Letters Patent No. 208,584, dated October 1, 1878; application filed September 9, 1878.

*To all whom it may concern:*

Be it known that I, CHARLES FONTAYNE, of the city, county, and State of New York, have invented a new and useful Process for Ornamenting Glass, &c., which process is fully set forth in the following specification.

The object of this invention is to ornament glass plates as panels or for frames to be suspended in windows, or any glass or translucent ware, by transferring onto the surface of the same printed pictures, or such as are formed with printers' ink, as decalcomanie, &c., in such a manner that the best effects of the light passing through said transparent material may be produced upon the said pictures or the colors of which they may be formed.

Various efforts have been made to transfer printed colors onto the surface of glass, and among them the pictures known as "decalcomanie;" but in all the processes known to me there is the necessity of introducing some gummy substance in a partially liquid state between the color or colors to be transferred, which substance has to possess a sticking or "tacky" nature when the transfer is made, and either fails to draw the color or colors from their foundation to the glass in an even manner, or when done is liable to crack in drying upon the smooth surface, and thereby crack the colors, and when fully dry is very liable to scale off, or in time turn to an unsightly yellow color by the employment of oils or other substances, which change by the absorption of oxygen.

Now, by my process all these objections are overcome in the following manner: Take, for example, a picture such as is used in the decalcomanie process of making transfers. I first coat the surface of the colors printed upon a surface prepared with substances soluble in water, but which substances are impervious to the oils or varnishes of which the printing-inks are made, with the solution well known in the art as "leather collodion," or collodion treated with oil, and which, when dry, forms a tough film over the surface of the print.

The use of collodion only, as a transferring agent, has been mentioned; but it is evident that other substances may be used for this kind of work—as, for example, some of the compounds of rubber and similar gums that may be made transparent, and are also insoluble in water.

As soon as this is thoroughly dry on the print, I then lay the sheet on the surface of a basin of water, or dampen it in some other suitable manner, and then lay the coated side of the print on the glass and press it firmly thereon, and remove all the air and press out by means of a gentle pressure as much of the water as possible, and thus bring all portions of the collodion close to the glass, after which I strip off the paper backing while wet from the colors, leaving them in close contact with the collodion coating, which is in contact with the glass, and which will not crack or obstruct the light or leave an unfinished appearance to the glass.

I then, by means of water and a camel's-hair brush, wash off all the paste or gummy substances of the print, in some cases using a dilute solution of acetic acid to completely effect its removal. By this means the varnish will more effectually penetrate the film and more permanently fix it to its adhering surface.

After the colors have become dried, or the water has evaporated therefrom, a coating of transparent or spirit varnish is then floated over the surface, which has the effect to pass through the colors and the collodion film to such an extent as to perfectly fix the colors to the glass.

Any print made of printing ink on paper, or some substance soluble in water, or which will not dissolve the ink, may be transferred in the same manner, the collodion film becoming the means not only of transferring the color or colors of the pictures, but an agent (insoluble in water) to hold the color or colors upon the glass or other translucent surface, and by which the most delicate and permanent ornamentation may be produced.

I claim—

The process of ornamenting glass or similar articles by transferring thereon printed pictures or designs by the use of collodion as a transfer-sheet, substantially as set forth.

CHARLES FONTAYNE.

Attest:
   J. WM. RIPLEY,
   BOYD ELIOT.